(12) United States Patent
Nomerange

(10) Patent No.: US 6,182,523 B1
(45) Date of Patent: Feb. 6, 2001

(54) MOTORIZED ACTIVATION

(75) Inventor: Hervé Marcel Nomerange, Caen (FR)

(73) Assignee: Meritor Light Vehicle Systems - France, Sully sur Loire (FR)

( * ) Notice: Under 35 U.S.C. 154(b), the term of this patent shall be extended for 0 days.

(21) Appl. No.: 09/343,982

(22) Filed: Jun. 29, 1999

(51) Int. Cl.$^7$ .............................. F16H 1/16; H02K 7/116
(52) U.S. Cl. ................... 74/425; 384/192; 310/90
(58) Field of Search .................... 74/89.14, 425; 384/192; 310/90

(56) References Cited

U.S. PATENT DOCUMENTS

| | | | |
|---|---|---|---|
| 3,848,477 | * 11/1974 | Giandinoto et al. | ..... 74/425 |
| 4,420,703 | * 12/1983 | Adam et al. | ..... 310/90 X |
| 5,325,736 | * 7/1994 | Tsujita | ..... 74/425 |
| 5,886,437 | * 3/1999 | Bohn et al. | ..... 310/90 |

FOREIGN PATENT DOCUMENTS 2016213   9/1979 (GB).

* cited by examiner

Primary Examiner—Richard M. Lorence
(74) Attorney, Agent, or Firm—Carlson, Gaskey & Olds

(57) ABSTRACT

A motor unit for operating a functional member of a vehicle includes a motor portion and a gearing portion. The gear portion includes a wheel gear intermeshed with a worm gear driven by a shaft. The shaft is supported by a plurality of mounts. At least one of the mounts and the shaft defines a complementary contacting surface having a bowed cross section. The bowed cross section minimizes any misalignment problems of the shaft and reduces deformation of the shaft when torque is blocked.

16 Claims, 1 Drawing Sheet

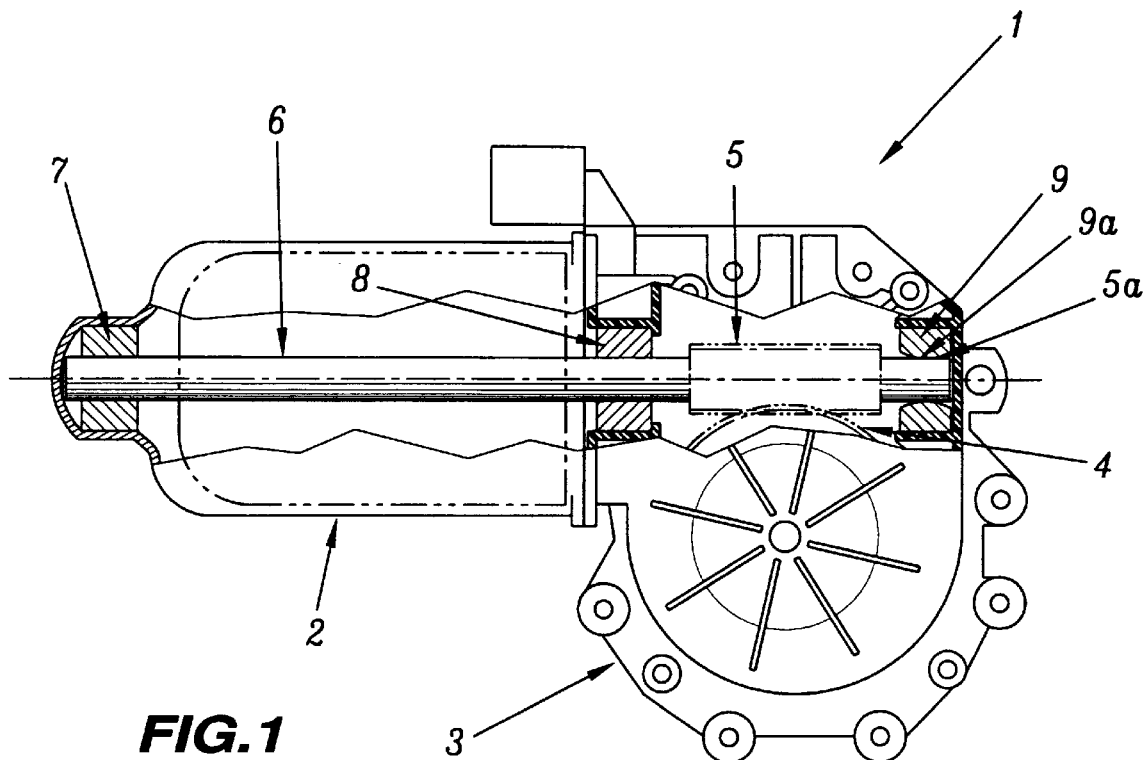
_FIG.1_
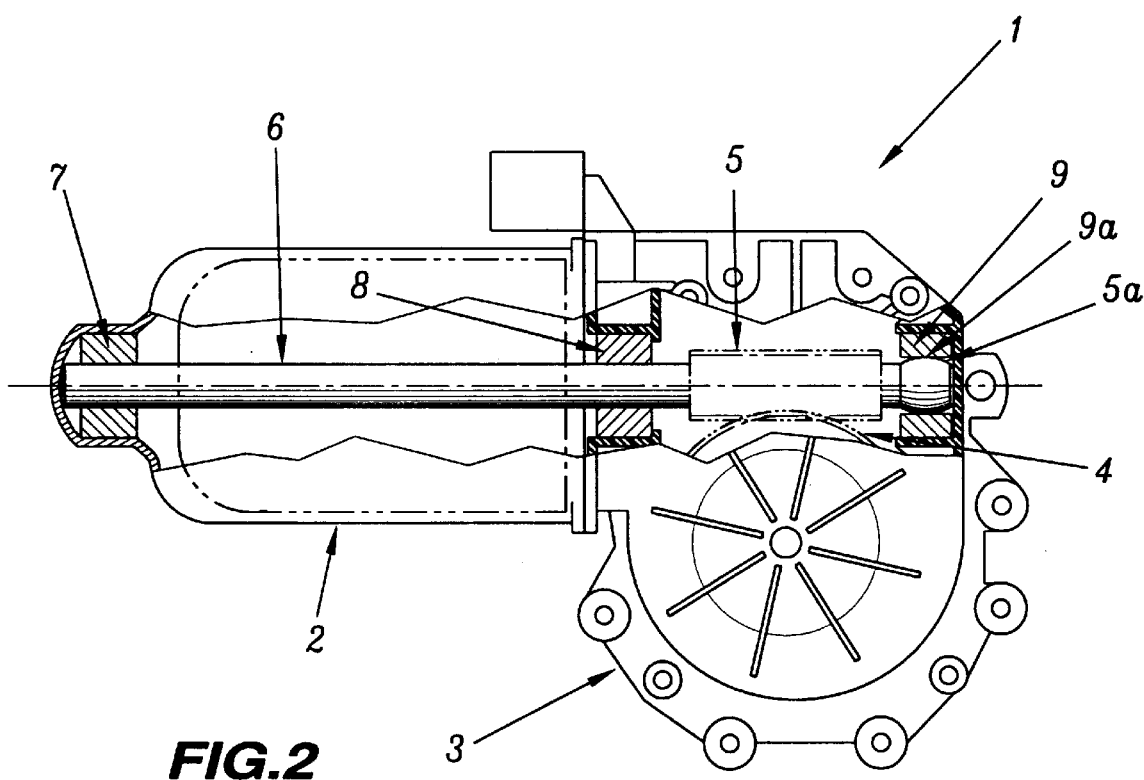
_FIG.2_

MOTORIZED ACTIVATION

The present invention relates to a geared motor unit for operating a functional member of a motor vehicle.

More specifically, the invention relates to such a geared motor unit which comprises a motor portion and a gearing portion with worm and wheel, the worm of which is associated with the shaft of the motor and three bearings for guiding these, the first two of which are arranged one on each side of the motor portion and the third of which is arranged at the opposite end of the worm to the motor portion.

Such geared motor units for example form part of motor vehicle window-lifter mechanisms.

However, the structure of these geared motor units does have a certain number of drawbacks because it is extremely difficult to perfectly align the three bearings when mounting them.

This misalignment causes running noise and friction that leads to a reduction in the performance of the geared motor unit.

The object of the invention is therefore to solve these problems.

To this end, the subject of the invention is a geared motor unit for operating a functional member of a motor vehicle, of the type comprising a motor portion and a gearing portion with worm and wheel, the worm of which is associated with the shaft of the motor and three bearings for guiding these, the first two of which are arranged one on each side of the motor portion and the third of which is arranged at the opposite end of the worm to the motor portion, characterized in that the complementary contacting surfaces of the third bearing and/or of the worm have a bowed cross section.

The invention will be better understood from the description which will follow, given merely by way of example and made with reference to the appended drawings, in which:

FIG. 1 depicts a diagrammatic sectional view of a first embodiment of a geared motor unit according to the invention; and FIG. 2 depicts a diagrammatic sectional view of a second embodiment of a geared motor unit according to the invention.

Specifically, these figures show a geared motor unit denoted by the general reference 1, for operating a functional member of a motor vehicle, such as a window-lifter mechanism for example.

In the conventional way, such a geared motor unit comprises a motor portion denoted by the general reference 2, and a gearing portion with worm and wheel denoted by the general reference 3. The wheel of this mechanism is denoted by the general reference 4, while its worm is denoted by the general reference 5 and is associated with the shaft of the motor, denoted by the general reference 6.

It can be seen that this worm and this shaft may be produced in the form of two separate components or in the form of one single component.

Furthermore, such a geared motor unit also has three bearings for guiding this shaft and worm, the first two bearings, denoted by the general references 7 and 8, being arranged one on each side of the motor portion 2, while the third bearing, denoted by the general reference 9, is arranged at the opposite end of the worm 5 to the motor portion 2.

According to the invention, the complementary contacting surfaces of the third bearing 9 and/or of the worm 5, that is to say the surfaces 9a and 5a respectively, have a bowed cross section.

Thus, for example, in FIG. 1, the contacting surface 9a of the third bearing 9 is bowed, whereas, in FIG. 2, it is the complementary contacting surface 5a of the worm 5 which is bowed. When the term "bowed" is utilized in this application, it refers to a curved shape such as shown in the drawings wherein a central portion of the bowed surface would be spaced closer to the other part of the contact surface than portions on each axial side of the central portion. That is, the surfaces are bowed in the direction of the other part which provides the contact surface with a central location being spaced towards the part and axially spaced side portions being bowed away from this central portion.

This makes it possible to solve the misalignment problems mentioned previously and also to reduce the problems associated with the deformation of the shaft, for example when torque is blocked.

It of course goes without saying that different embodiments of these contacting surfaces may be envisaged.

What is claimed is:

1. A motor unit for a vehicle, comprising:
   a motor having a shaft;
   a plurality of mounts to rotatably support said shaft, at least one of said mounts and said shaft defining a contact surface;
   said contact surface having a bowed cross section, said bowed cross section having a central portion formed on said at least one of said mount and said shaft which is spaced closer to the other than axially spaced side portion to form said bowed cross-section.

2. The motor according to claim 1, wherein said shaft defines said contact surface.

3. The motor according to claim 2, wherein said bowed-shape results in a central portion of said shaft at said contact surface being spaced radially closer to said mount, than axial side portions of said shaft spaced on each axial side of said central portion.

4. The motor according to claim 1, wherein said mount defines said contact surface.

5. The motor according to claim 4, wherein said bowed-shape results in a central portion of said mount at said contact surface being spaced radially closer to said shaft, than axial side portions of said shaft spaced on each axial side of said central portion.

6. The motor according to claim 1, further comprising a worm gear attached to said shaft, said worm gear defining said contact surface.

7. The motor according to claim 1, wherein said mount is a bushing.

8. The motor according to claim 1, wherein said mount is a bearing.

9. A motor unit for a vehicle, comprising:
   a motor;
   a shaft driven by said motor, said shaft having a first end and an opposed end;
   a first mount to rotatably support said first end of said shaft;
   a second mount to rotatably support an intermediate portion of said shaft;
   a third mount to rotatably support said opposed end of said shaft, said third mount and said shaft defining a contact surface;
   said contact surface having a bowed cross section, said bowed cross section having a central portion formed on said at least one of said mount and said shaft which is spaced closer to the other than axially spaced side portions to form said bowed cross-section.

10. The motor according to claim 9, wherein said shaft defines said contact surface.

11. The motor according to claim 10, wherein bowed-shape results in a central portion of said shaft at said contact surface being spaced radially closer to said mount, than axial side portions of said shaft spaced on each axial side of said central portion.

12. The motor according to claim 9, wherein said mount defines said contact surface.

13. The motor according to claim 12, wherein said bowed-shape results in a central portion of said mount at said contact surface being spaced radially closer to said shaft, than axial side portions of said shaft spaced on each axial side of said central portion.

14. The motor according to claim 9, further comprising a worm gear attached to said shaft, said worm gear defining said contact surface.

15. The motor according to claim 9, wherein said third mount is a bushing.

16. The motor according to claim 9, wherein said third mount is a bearing.

* * * * *

UNITED STATES PATENT AND TRADEMARK OFFICE
CERTIFICATE OF CORRECTION

PATENT NO. : 6,182,523 B1
DATED : February 6, 2001
INVENTOR(S) : Nomerange

Page 1 of 1

It is certified that error appears in the above-identified patent and that said Letters Patent is hereby corrected as shown below:

<u>Title page,</u>
Please insert the following:
-- (30)   Foreign Application Priority Data
June 29, 1998 (FR) France.......................9808243 --

Signed and Sealed this

Twenty-third Day of October, 2001

Attest:

*Nicholas P. Godici*

NICHOLAS P. GODICI
*Attesting Officer*  *Acting Director of the United States Patent and Trademark Office*